United States Patent [19]
Sakaguchi

[11] 3,900,366
[45] Aug. 19, 1975

[54] EMERGENCY COOLING APPARATUS FOR REACTORS

[75] Inventor: Seiichiro Sakaguchi, Hitachi, Japan

[73] Assignee: Hitachi, Ltd., Tokyo, Japan

[22] Filed: Apr. 2, 1974

[21] Appl. No.: 457,365

[30] Foreign Application Priority Data
Apr. 2, 1973  Japan.............................. 48-36727

[52] U.S. Cl. ...................... 176/37; 176/38; 176/65; 176/92
[51] Int. Cl. .............................................. G21c 9/00
[58] Field of Search .............. 176/50, 65, 37, 38, 92

[56] References Cited
UNITED STATES PATENTS
| | | | |
|---|---|---|---|
| 3,438,431 | 4/1969 | Dreyer et al. ......................... | 176/37 |
| 3,607,630 | 9/1971 | West et al. ............................ | 176/38 |

FOREIGN PATENTS OR APPLICATIONS
| | | | |
|---|---|---|---|
| 81,242 | 7/1963 | France ................................. | 176/38 |

*Primary Examiner*—Harvey E. Behrend
*Attorney, Agent, or Firm*—Thomas E. Beall, Jr.

[57] ABSTRACT

In a nuclear reactor of the type having the core surrounded by coolant and an inert cover gas all sealed within a container, an emergency cooling apparatus employing a detector that will detect cover gas or coolant, particularly liquid sodium, leaking from the container of the reactor, to release a heat exchange material that is inert to the coolant, which heat exchange material is cooled during operation of the reactor. The heat exchange material may be liquid nitrogen or a combination of spheres and liquid nitrogen, for example, and is introduced so as to contact the coolant that has leaked from the container quickly so as to rapidly cool the coolant to prevent or extinguish combustion.

11 Claims, 3 Drawing Figures

EMERGENCY COOLING APPARATUS FOR REACTORS

BACKGROUND OF THE INVENTION

The present invention relates to an emergency cooling apparatus for nuclear reactors, particularly with respect to the container of the reactor.

Boiling water type nuclear reactors and pressurized type nuclear reactors each use water as a coolant thereof. Therefore, emergency cooling apparatus for the containers of these reactors employ water or ice, and different construction for the emergency cooling apparatus have been developed.

For a fast breeder nuclear reactor, which employs sodium as a coolant thereof, an emergency cooling apparatus for the container has not been provided as yet. Sodium will violently react with water to produce reaction products, such as hydrogen gas. Therefore, the emergency cooling apparatus for reactors employing sodium as a coolant cannot employ water or ice for emergency purposes, which has heretofore been conventional. Further, the sodium reacts with oxygen violently to make a sodium fire, which will greatly elevate the temperature in the container, due to the chemical reaction in addition to the elevation in pressure due to the nuclear energy. With such a pressure elevation and sodium as an aerosol, there will be considerable problems, such as fission products being dispersed in the atmosphere and fission products adhering to structure that may be removed. Choking or containment of a sodium fire by the use of an inert gas or powder fire extinguisher will take too long a time to extinguish the fire, further the fire extinguisher may produce additional problems, for example, the nozzle of the extinguisher may become clogged with powder.

SUMMARY OF THE INVENTION

It is an object of the present invention to provide an emergency cooling apparatus for reactors, which will have a high safety and which can cool promptly.

The present invention, in brief, resides in that in an emergency cooling system for a nuclear reactor, there is provided means for detecting the emergency condition and providing a heat exchange material that is inert to the coolant, which is usually a liquid metal such as sodium, and which is cooled during the operation of the reactor, so that upon detecting the emergency condition, the heat exchange material may be released so as to contact with the coolant that has leaked from the container of the reactor to thereby promptly cool the leaked coolant and prevent or extinguish a fire.

BRIEF DESCRIPTION OF THE DRAWING

Further objects, features and advantages of the present invention will become more clear from the following detailed description of preferred embodiments as shown in the accompanying drawing, wherein.

DETAILED DESCRIPTION OF THE PREFERRED EMBODIMENTS

Figure 1:
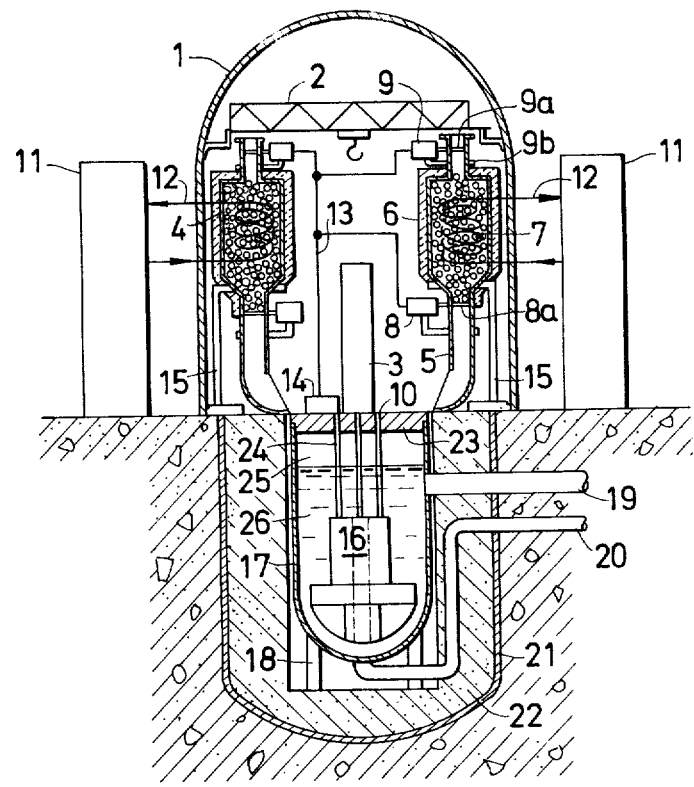
FIG. 1 is a cross-sectional view through a nuclear reactor employing one embodiment of an emergency cooling apparatus for reactors according to the present invention.

In FIG. 1, there is shown a nuclear reactor core 16 that is disposed in the core container 17. The core container 17 is sealed by means of a plug 23 at the top thereof, and provided with an inlet pipe 20 and outlet pipe 19 for a coolant such as liquid sodium. The coolant 26 for the reactor enters the core container 17 from the inlet pipe 20 and is discharged through the outlet pipe 19 after cooling the nuclear reactor core 16. Control rods 24 are provided in a conventional manner and further an inert cover gas 25 is provided between the liquid coolant and the plug 23.

The core container 17 is in turn contained within a safety container 21 that is disposed beneath a floor 10, with suitable supporters 18 supporting the container 17 within the container 21 and a shield of graphite 22 covering the container 21. On the floor 10, there is mounted a further container 1, which is provided with a suitable crane 2, a fuel exchanger mechanism 3, and part of an emergency cooling apparatus for the container 1.

The emergency cooling apparatus of the present invention comprises a quantity of heat exchange material, particularly balls or spheres 7 that are preferably constructed of stainless steel, a pair of heat exchange material containers 4, each of which is covered by a heat insulation such as asbestos and has lower and upper openings provided with electromagnetic valves 8, 9. The electromagnetic valves are provided with shutters 8a, 9a and clamps 8b, 9b for securing the electromagnetic valves 8, 9 to the ball or heat exchange material containers 4. Frames 15 are provided to mount each of the containers 4 on the floor 10 at a proper height. Heat exchange material, particularly ball, guides 5 have their upper end fixed in communication with the respective container 4 and their lower end disposed adjacent to floor 10 to deliver the heat exchange material to the floor 10 in the vicinity of the upper portion of the plug 23 upon opening of the electromagnetic valves 8, for each of the containers 4.

A contact type leakage detector 14 is disposed on the floor 10 above the core container, particularly adjacent the upper portion of the plug 23 so as to detect leaking cover gas 25 or leaking coolant 26. Upon detecting such leakage, the detector 14 will send an electric signal to the electromagnetic valves 8 and 9 through control wires 13 to open the electromagnetic valves 8, 9.

During operation of the nuclear reactor, refrigeration or low temperature apparatus 11 such as apparatus for liquifying nitrogen gas, are connected to the ball containers 4 through cooling pipes 12 for circulating liquid nitrogen through the ball containers 4 to maintain the heat exchange material at a low temperature.

During operation of the nuclear reactor, the low temperature apparatus 11 will run constantly to circulate the liquid nitrogen so that the temperature of the solid balls 7 will be kept at −200°C. When leakage occurs due to an abnormal condition or emergency condition of the reactor such that the sodium coolant 26 for the reactor core 16 may leak into the container 1 to form a pool of liquid sodium on the floor 10, or when the cover gas, which is usually argon gas, and sodium vapor leak from the container 1, this may bring about an abnormal temperature and pressure elevation in the container 1. Such an abnormal condition is detected by the leakage detector 14, which generates an electric signal when the leakage detector 14 is contacted with the liquid sodium leaked from the core container 17 onto the floor 10. The detector may also detect coolant vapor or the cover gas leakage. With such an electric signal indicating leakage, the electromagnetic valves 8 and 9 are operated to open the shutters 8a and 9a, which will result in releasing of the solid balls. The falling solid balls will be conducted by the guides 5 to spread out so as to cover all of the floor 10. The solid balls on the floor 10 will make quick heat exchange contact with the pool of sodium and the argon gas leaked into the container 1, to lower the temperatures of the material that has leaked. Since sodium has a high surface heat transfer coefficient with a solid surface, it is promptly cooled. Accordingly, if the sodium appears in a liquid phase, it is promptly solidified, which will prevent a sodium fire or extinguish a sodium fire that has already started.

The diameter of the solid balls is selected for its thermal effect, fluidity of the falling balls, ease of withdrawal, economy, etc., and preferably is within the range of several millimeters diameter to several tens of millimeters diameter.

Assuming that an accidental leakage of the sodium has occurred, the efficiency with which the sodium is cooled, by way of example with stainless steel balls, will be explained hereinafter by computation.

The change in temperature of the sodium and the balls with time is given by the following equation:

$$\rho C V \frac{dT}{dt} = h \cdot s (T - T_N) \quad (1)$$

$$\rho_N C_N V_N \frac{dT_N}{dt} = h \cdot s (T_N - T) \quad (2)$$

wherein, (letters with suffix $_N$ represent factors of sodium, letters with no suffix represent factors of the stainless steel balls)

| | |
|---|---|
| $\rho, \rho_N$ | density |
| $C, C_N$ | specific heat |
| $V, V_N$ | volume of one of the balls, volume occupied by one of the balls |
| $h$ | surface heat transfer coefficient between the ball and the sodium |
| $s$ | surface area of the balls |
| $t$ | time |
| $T, T_N$ | temperature |

In the above equation, an item of reaction heat and heat discharge into the outside of the system are out of consideration for simplifying the equation. Further it is assumed that temperature distributions of the sodium and the balls are uniform.

Figure 2:
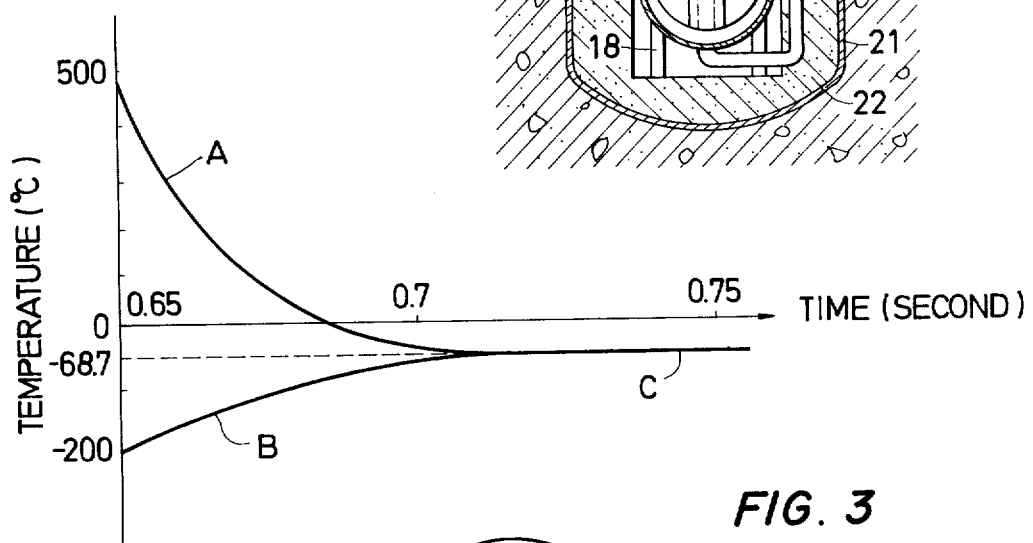
FIG. 2 is a graph showing the relationship between the temperature of the heat exchange medium, particularly solid balls, the temperature of the sodium coolant, and the cooling time.

Computations employing the above equations are shown graphically in FIG. 2, which result is based on 1 ton of leaked sodium at 500°C being cooled by 10 tons of stainless steel balls, each of which has a 10 millimeter diameter, with the balls being cooled to −200°C by liquid nitrogen, and with a surface heat transfer coefficient of $10^5$ Kcal/M$^2$ $h$ °C, and further with the balls falling from a height of 2 meters. In FIG. 2, A represents the temperature curve of the sodium; B represents the temperature curve of the stainless steel balls; and C represents the equilibrium temperature line. As is apparent from FIG. 2, the balls contact with the sodium in about 0.65 seconds after starting their fall, and thereafter they promptly cool the sodium to about −70°C. As the sodium is solidified at this temperature, it will not burn with any smoke or flame, even if its surface is oxidized. The cooling ability of the solid balls which have fallen declines by the temperature elevation thereof due to collapsed heat and heat brought about by free convection of the gas from its circumference, and thereafter comes to an end. However, since the shutters 8a and 9a of the ball containers 4 are opened, the liquid nitrogen or gas within the containers is supplied at a low temperature by the cooling pipes 12 to thereby further bring about a cooling effect, and this gas is circulated as before through the refrigeration apparatus 11 to continue the cooling.

Instead of using stainless steel balls as the heat exchange material, other heat exchange material of large heat capacity may be used as lead, zinc, aluminum, and different kinds of steel or iron, with the steel or iron being coated by a material that has a coexistence with the sodium that is excellent, for example coating with stainless steel. Further, the heat exchange material may employ solid particles of fireproof material such as a fire brick, which is much the same as metals in heat capacity, but smaller than the metals in heat conductivity. Accordingly, in the case of non-metallic fireproof material being used, the diameter of the nonmetallic fireproof material balls or particles must be smaller to obtain an adequate heat conductivity effect.

Further, the heat exchange material that is circulated through the containers 4 by pipes 12 and the apparatus 11 may be liquid argon or liquid helium, instead of the liquid nitrogen specifically mentioned above.

Figure 3:
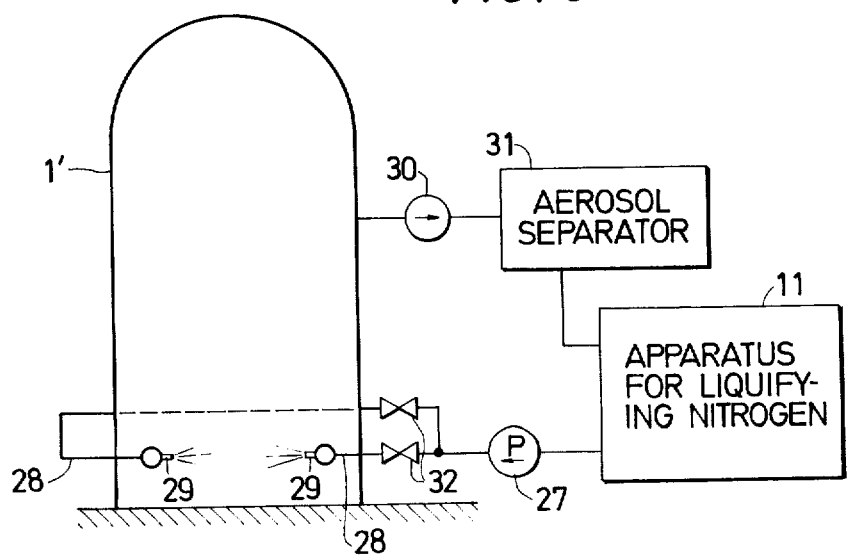
FIG. 3 is a schematic illustration of another embodiment according to the present invention.

A further embodiment of the present invention is shown in FIG. 3 in schematic form, since the structure is the same as that shown and described with respect to FIG. 1, except for the specific differences that will appear below.

The low temperature apparatus or refrigeration apparatus 11 will liquify an inert gas such as nitrogen gas, or one of the above mentioned gases. The liquified gas from apparatus 11 is fed by means of pump 27 through valves 32 and pipes 28 to each of two or more nozzles 29, which nozzles are disposed so that the liquid nitrogen sprayed from the nozzles 29 will rapidly cool any pool of liquid coolant, such as a sodium, that may have leaked from the core container (shown in FIG. 1) into the container 1'. The blower 30 is used for withdrawing part of the inert gas from the container 1', which inert gas being fed into the container 1' by the nozzles 29 will cause a pressure elevation within the container 1', unless removed. An aerosol separator 31 will receive the gas from the blower 30 and separate solid particles, such as sodium aerosol, from the inert gas, so that only the inert gas will be returned to the apparatus 11 to be liquified. Thus, the containers 4 and guides 5 with the spherical heat exchange materials therein are replaced by nozzles 29 in FIG. 3, so that instead of liquified inert heat exchange gas and cooled spheres being fed to the pool of sodium coolant upon emergency in FIG. 1, only liquified inert gas, such as nitrogen, will be fed to the pool of sodium coolant by nozzles 29 in the embodiment of FIG. 3. FIG. 1 employs both spherical solid particles and liquified inert gas as a heat exchange material, whereas FIG. 3 employs only liquified inert gas as a heat exchange material.

With the construction of FIG. 3, when leakage is detected by the detector (not shown in FIG. 3) as described above with respect to FIG. 1, for example when sodium coolant leaked into the container 1' is detected, the detector will send an electric signal to the valves 32, so that the valves 32 will be opened and permit the flow of liquified inert gas from the apparatus 11 to the nozzles 29 by operation of the pump 27, so that liquified inert gas will be sprayed by nozzles 29 upon the pool of coolant. Thereby, the pool of leaked coolant is quickly cooled by effective utilization of the latent and sensible heat of the liquified inert gas, to prevent or extinguish fires as mentioned above with respect to the operation of FIG. 1.

While preferred embodiments of the present invention have been described in detail for purposes of illustration and the advantages of their specific details, further embodiments, variations and modifications are contemplated within the broader aspects of the present invention, all as determined by the spirit and scope of the following claims.

What is claimed is:

1. Emergency cooling apparatus for nuclear reactors having a normally sealed core container for containing a nuclear core, a coolant of liquid metal around the core within the core container, a cover gas above the liquid coolant within the core container, and a second auxiliary apparatus container above the core container, which comprises: means for detecting at least one of the cover gas and the liquid metal coolant leaked into the second container to produce an emergency signal, means for containing a heat exchange material that is inert to the liquid metal coolant; means for cooling the heat exchange material during the operation of the nuclear reactor; means for dispensing the heat exchange material to the lower portion of said second container where the liquid metal coolant would collect upon leakage to contact with the leaked coolant; and valve means normally preventing dispensing of the heat exchange material and releasing the heat exchange material to said dispensing means only in response to said emergency signal in accordance with the detection of the leaked coolant or cover gas by the means for detecting.

2. The emergency cooling apparatus for nuclear reactors as defined in claim 1, wherein said heat exchange material comprises a plurality of solid balls.

3. The emergency cooling apparatus for nuclear reactors as defined in claim 2, wherein each of said solid balls has a surface of stainless steel.

4. The emergency cooling apparatus for nuclear reactors as defined in claim 2, wherein said heat exchange material further comprises a fluid circulating around said solid balls, and said means for cooling includes refrigeration means cooling said fluid and circulating said fluid through said balls.

5. The emergency cooling apparatus for nuclear reactors as defined in claim 4, wherein said cooling means further comprises cooling supply and exhaust pipes communicatiing between said means for containing and said refrigeration means.

6. The emergency cooling apparatus for nuclear reactors as defined in claim 5, wherein said means for containing is cylindrical in its shape and has shutter means in the lower and upper portions thereof, with said shutter means constituting said valve means.

7. The emergency cooling apparatus for nuclear reactors as defined in claim 6, wherein said shutter means includes an electromagnetic operator means responsive to the emergency signal.

8. The emergency cooling apparatus for nuclear reactors as defined in claim 7, wherein said electromagnetic operator means is connected with said detecting means through electric wires.

9. The emergency cooling apparatus for nuclear reactors as defined in claim 4, wherein said refrigeration means liquifies said heat exchange fluid.

10. The emergency cooling apparatus for nuclear reactors as defined in claim 1, wherein said heat exchange material is a gas, said means for cooling liquifies said gas, and said means for dispensing is nozzle means for spraying said gas across the bottom of said second container.

11. The emergency cooling apparatus for nuclear reactors as defined in claim 10, further including means responsive to said emergency signal for removing gas from the upper portion of said second container and delivering the gas to said means for cooling the heat exchange material; means for separating the gaseous heat exchange material from aerosol particles of said liquid metal coolant upstream of said means for cooling, to deliver only the thus separated heat exchange gas to said means for cooling.

* * * * *